United States Patent
Bor

[15] 3,673,147
[45] June 27, 1972

[54] METHOD OF PREPARING DELUSTERED FILAMENTS AND FIBERS

[72] Inventor: Thomas P. Bor, Richmond, Va.
[73] Assignee: Allied Chemical Corporation, New York, N.Y.
[22] Filed: April 27, 1970
[21] Appl. No.: 31,917

[52] U.S. Cl. ...........................260/37 N, 260/41 B, 264/140
[51] Int. Cl. .........................................................C08g 51/04
[58] Field of Search ...........................260/37 P, 41 B, 37 NP; 106/308; 264/140; 241/175

[56] References Cited

UNITED STATES PATENTS

| | | | |
|---|---|---|---|
| 3,286,939 | 7/1961 | Karpenko et al. | 241/175 |
| 3,100,088 | 10/1961 | Podmore | 241/170 |
| 2,718,471 | 9/1955 | Samler | 106/181 |
| 2,477,009 | 8/1949 | Sandler | 106/198 |
| 2,689,839 | 8/1951 | Heckert | 260/37 |
| 2,962,466 | 11/1960 | Parnell | 260/37 |
| 3,371,055 | 2/1968 | Illing et al. | 260/18 |
| 3,324,071 | 6/1967 | Skoog | 260/37 |
| 3,224,997 | 12/1965 | Hunter | 260/41 |
| 3,190,850 | 7/1965 | Burke | 260/38 |

OTHER PUBLICATIONS

Modern Plastics, Simpson, pp. 417– 419, Coloring Plastics 1965
Encyclopedia of Plastics Equipment, Simonds, p. 34– 36 1966

*Primary Examiner*—Morris Liebman
*Assistant Examiner*—Richard Zaitlen
*Attorney*—Roy H. Massengill and Luther A. Marsh

[57] ABSTRACT

The process for preparing delustered filaments and fibers is carried out by adding an amount of delustrant in a ratio of 5 to 20 parts by weight of delustrant per 100 parts of polymer chips under an inert blanket, grinding said delustrant with said polymer chips with grinding balls of about one-half to 1¼ inches in diameter by vibrating at about 2 to 10 mm amplitude and at a frequency of about 600 to 3,600 cycles per minute while incrementally increasing the temperature from about ambient to about 20° C. below the softening point of said polymer and obtaining a pigment dispersion of substantially less than 1 micron particle size and separating the balls from the pigmented polymer.

9 Claims, 1 Drawing Figure

PATENTED JUN 27 1972

3,673,147

INVENTOR.
Thomas P. Bor

BY

*Luther H. Marsh*

ATTORNEY

METHOD OF PREPARING DELUSTERED FILAMENTS AND FIBERS

BACKGROUND OF THE INVENTION

This invention relates to a process for the preparation of delustered filaments and of high molecular weight polymers and to the composition of matter derived therefrom.

Methods of preparing articles of commerce, such as filaments, fibers, film, etc. from synthetic linear condensation polymers are well known. See, for example, U.S. Pat. Nos. 2,465,319 to Whinfield et al. and 2,901,466 to Kibler et al. wherein synthetic linear condensation polyesters are prepared and U.S. Pat. Nos. 2,130,523 wherein synthetic linear condensation polyamides are prepared. Other types of synthetic condensation polymers are polyethers, polyureas, polysulfonamides, epoxy resins and the like and copolymers of such materials. By the term "synthetic linear condensation polymer" is meant a polymer which can be formed by polymerization with the elimination of small molecules such as $HCl$, $H_2O$ $NaCl$, $NH_3$ and the like.

When adding pigments to yield a coloring or delustering effect to a high molecular weight polymer, it is necessary to distribute the pigment as perfectly as possible throughout the polymer. Previous efforts to incorporate a pigment into a high molecular weight polymer include a method of incorporating the pigment first into a low melting prepolymer of low molecular weight and then to stir the molten concentrate so obtained into a molten polymer of high molecular weight and then spinning the resulting pigmented polymer into filaments and fibers. This process has the disadvantage wherein it is necessary to add to the high molecular weight polymer a polymer containing the pigment of low molecular weight, which, as is well known, causes degradation of the high molecular weight polymer by lowering its softening point and thus substantially impairing the quality of the filaments and fibers prepared therefrom. Other methods consist of introducing delustrants in the form of finely divided substances to the molten polymer in solid state, or in the form of solution dispersion or suspension and then precipitated by removal of the solvent. While the above-described methods are satisfactory, often they require the polymer in molten condition and highly sophisticated filtering operations are usually required to prevent any agglomerates getting through the extrusion process which results in the formation of filaments and fibers having weak points if said agglomerates get through the extrusion process. Such control often required extra processing steps which require extra initial costs and continuing processing costs. Accordingly, a primary object of the present invention is to provide a new and improved method for preparing a delustered synthetic linear condensation polymer. Another object of this invention is to provide a new and improved method for preparing a delustered synthetic linear condensation polymer more economically than heretofore. Another object of this invention is to provide a new and improved method for preparing a delustered synthetic linear condensation polymer with significantly less equipment and material handling.

Other objects will be apparent from the following description and drawing in which:

FIG. 2 is a microphotograph of a multifilament formed of a polyester polymer which has been pigmented with anatase titanium dioxide in accordance with the present invention;

FIG. 3 is a microphotograph of a monofilament formed of a polycaproamide polymer which has been pigmented with anatase titanium dioxide fine powder in accordance with the present invention.

Figure 1:
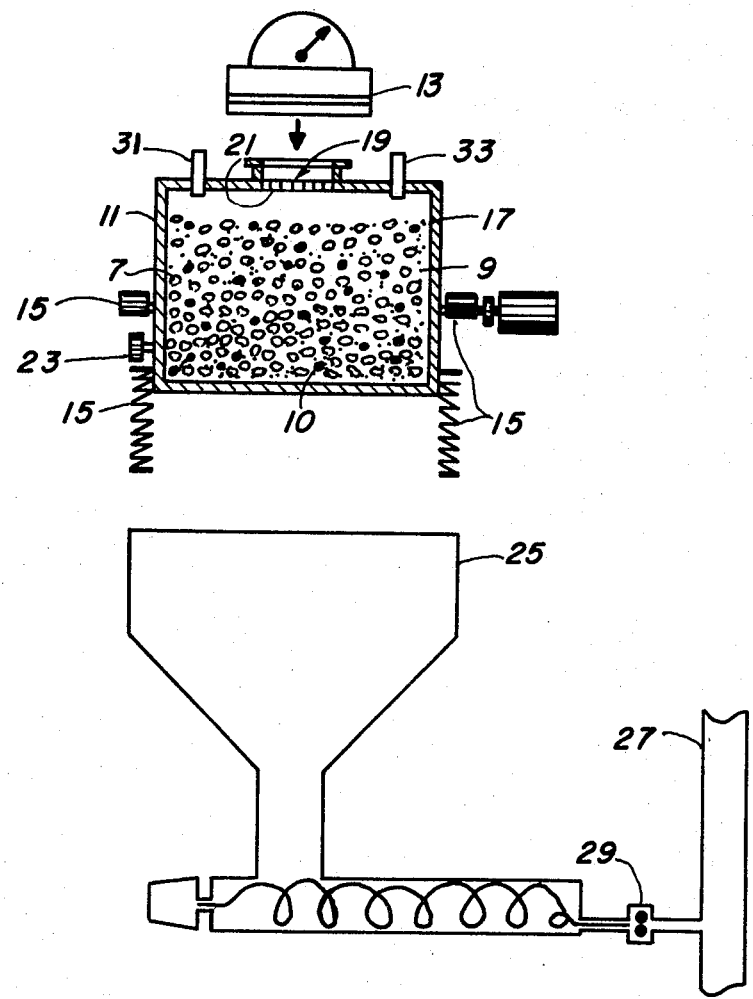
FIG. 1 is a flow diagram illustrating the principles and type of equipment involved in the practice of the method of the present invention.

In practicing my invention, I place in a vibratory ball mill the grinding balls or pebbles of about one-half to 1¼ inches in diameter. I then add a mixture consisting of polymer chips and the specific delustrant desired in a ratio of about 5 to 20 parts delustrant to 100 parts chips, and the mill is purged and brought under an inert atmosphere; the grinding and dispersion is accomplished by vibrating said mixture of polymer chips and delustrant at about 2 to 10 mm amplitude and at a frequency of about 600 to 3,600 cycles per minute while simultaneously increasing the temperature of said mixture from about ambient to about 20° C. below the softening point of said polymer to produce a pigment dispersion of substantially less than 1 micron particle size with less than 5 percent pigment in the 1 to 5 micron particle size in the polymer, then separating the grinding balls from the pigmented polymer and extruding said pigmented polymer into a shaped structure. Excellent delustrant dispersions are obtained as can be seen from the photomicrographs as illustrated in FIGS. 2 and 3.

Referring to FIG. 1 of the drawing, initial solid state mixing of polymer chips 7 and one or more pigments 9 required for a desired delustrant can be achieved, for example, with an Apex vibratory ball mill 11, containing grinding balls or pebbles 10 of about one-half to 1¼ inches of diameter, and manufactured by the Apex Construction Company of London, England. Such mill contains a variety of vibratory means 15 by use of eccentric weights and spring systems such as, amplitude and cycles per minute as well as heating means 17, such as steam coils, dowtherm jackets or electrical resistance heating means, an entrance and exit means 19 containing a ball or pebble retaining grid 21 to allow separation of the pigmented polymer from the grinding balls or pebbles 10. An emptying means 23 allows the vibratory mill 11 to be turned 180° for emptying. Upon completion of the pigmenting cycle, the pigmented polymer is discharged into a masterbatch hopper 25 which feeds into a main polymer stream 27 through a conventional metering means 29. The polymer chips 7 are added along with the desired pigment 9 in the required ratio after being weighed on scales 13, preferably in a ratio of about 5 to 20 parts pigments to about 100 parts polymer chips to the grinding mill container containing grinding balls or pebbles 10. The mill is purged through line 31 and brought under an inert atmosphere through line 33. The vibratory mill is started containing the grinding balls, polymer chips and delustrant, and the amplitude is controlled between about 2 and about 10 mm and at a frequency of about 600 to about 3,600 cycles per minute while simultaneously increasing the temperature through heating means 17 of said mixture from ambient to about 20° C. below the softening point of said polymer. This temperature is maintained for a sufficient time to produce a pigment dispersion of substantially less than 1 micron particle size and with less than 5 percent pigment in the 1 to 5 micron particle size in the polymer. The pigmented polymer is then allowed to cool and then discharged into masterbatch hopper 25 which is then fed into a main polymer stream 27 as desired for delustering purposes. FIGS. 2 and 3 illustrate through microphotographs at a magnification of 560X the advantages of the present invention by showing excellent dispersion in both multifilament and monofilament type yarns made from pigmented polymer in accordance with this invention.

The following examples are presented for the purpose of illustrating the manner in which the present invention is conducted and the advantages obtained thereby. The examples are illustrative only and are not to be construed as limitative.

EXAMPLE 1 a. A small vibratory ball mill was modified to accept a jacketed stainless steel pot. Steam (45 psig) and condensate piping were attached to the jacket nozzles through flexible steam hoses. The pot was filled with ¾ inch diameter stainless steel balls to 80 percent filling, that is, about 25 in.³. The voids between the balls were filled with dry (0.1 percent moisture) amorphous polyester chips and anatase titanium dioxide (American Cyanamid Company Brand — Code 0-310) in the ratio 4:1. The total weight of polymer and delustrant was 0.5 lb. The mill pot was purged and brought under nitrogen blanket. The vibration was started at a frequency of 1,800 cycles per minute and the amplitude was adjusted to 5 mm. Steam was then turned on and the temperature of the contents brought to 145° C. in 40 minutes. The vibratory ball mill was operated at this temperature for a further 15 minutes. At this point the vibration was halted, the heating turned off, and the chips allowed to cool.

b. The masterbatch from step (a) was blended with untreated dry crystalline chips in the ratio of 1:99 in a tumbling blender. The resulting blend was extruded as a monofilament at 280° C. barrel temperature. Samples of the monofilament observed under a microscope at 560X magnification have exhibited good dispersion of the titanium dioxide.

EXAMPLE 2 a. The trough of a 50 liter capacity vibratory ball mill was fitted with electric heating mantles, and a vacuum connection. The trough was filled with ¾ inch diameter stainless steel balls amounting to 40 liters including void space. The 48 percent voidage between the balls was filled with crystallized polyester chips and anatase titanium dioxide fine powder (American Cyanamid Company Brand — Code 0–310) in the ratio of 9:1. The total weight of polymer and delustrant was 12 kg. The trough was purged and brought under 1 psig nitrogen pressure. The vibration was started and the electric heating switched on. The amplitude of vibration was set to 6 mm, and circular in characteristics with 1,200 frequency. The temperature of the contents reached 70° C. in 20 minutes. After a further 5 minutes of heating and vibrations vacuum was applied to 0.8 Torr. and the process continued until a temperature of 205° C. was achieved in 2 hours. At this temperature, the vibratory blending was continued for a further 1¼ hours, after which vacuum was replaced by dry nitrogen at 1 psig dewpoint — 40° C. and the contents allowed to cool. The delustered masterbatch from step (a) was melted in an extruder and metered into the exit line of a continuous polyethylene terephthalate train (0.64 intrinsic viscosity measured in 60 percent phenol and 40 percent tetrachloroethane) at 280° C. in the ratio of 1 part additive to 50 parts mainflow. The molten polymer was pumped into a spinblock and spun through a 200 hole spinnerette. Good uniform dispersion was observed upon the microscopic examination of the yarn.

EXAMPLE 3 a. A vibratory ball mill was filled with a stainless steel pot. The pot was filled with ½ inch diameter stainless steel balls to 80 percent volumetric filling. The voids between the balls were filled with polyamide chips of cylindrical shape of 0.05 inch diameter and 0.05 inch long and ground anatase titanium dioxide (American Cyanamid Company Brand — Code 0–310), in the weight ratio 19:1. The total weight of polymer and delustrant was 0.5 lb. The mill pot was closed, the vibration commenced and the amplitude adjusted to 5 mm. The frequency of vibration was 1,800 cycles per minute, and the operation continued for 1 hour. At this stage the mill was stopped and the chips separated from the balls.

b. The masterbatch from step (a) was blended with untreated polyamide chips of same size as above in a laboratory tumbling blender for 20 minutes. The mixture of masterbatch and untreated polyamide was adjusted to yield 0.15 percent delustrant content in the extruded yarn. After extrusion of the above blend as a monofilament the microscopic observation of the cross-section showed good dispersion of the delustrant.

While this invention has been described with respect to a number of specific embodiments, it is obvious there are other variations and modifications which may be resorted to without departing from the spirit of the invention except as more particularly pointed out in the appended claims.

I claim:

1. In the solid state process of preparing a delustered synthetic linear condensation polymer and extruding said polymer into a shaped structure, the method of incorporating a delustrant with a synthetic linear condensation polymer chips consisting essentially of grinding said delustrant with said polymer chips containing up to 20 parts by weight of delustrant per 100 parts polymer under an inert atmosphere with grinding balls of about one-half to 1¼ inches in diameter by vibrating said delustrant and polymer chips at about 2 to 10 MM amplitude and at a frequency of about 600 to 3,600 cycles per minute at a temperature incremental increase from about ambient to about 20° C. below the softening point of said polymer to produce a pigment dispersion of substantially less than 1 micron particle size with less than 5 percent pigment in the 1 to 5 micron particle size in said polymer, cooling said delustered polymer, separating said grinding balls from said pigmented polymer and extruding said pigmented polymer into a shaped structure.

2. The process of claim 1 wherein the ratio of grinding balls to delustrant and polymer chips is about 0.8 to 1.2 by volume.

3. The process of claim 1 wherein the condensation polymer is selected from the group consisting of polycaproamide and polyester polymer chips.

4. The process of claim 3 wherein the polymer chips are amorphous or crystalline.

5. The process of claim 1 wherein the delustrant is selected from the group consisting of rutile titanium dioxide and anatase titanium dioxide.

6. The process of claim 1 wherein the inert atmosphere is selected from the group consisting of the inert gases, nitrogen and carbon dioxide.

7. The process of claim 1 wherein the inert atmosphere is nitrogen.

8. The process of claim 1 wherein the polymer chips are amorphous and the temperature incremental increase is carried out over a period of about 45 to 75 minutes.

9. The process of claim 1 wherein the moisture content of the polymer chips is about 0.1 to about 0.5 percent.

* * * * *